United States Patent [19]

Hammill, III

[11] Patent Number: 4,684,247
[45] Date of Patent: Aug. 4, 1987

[54] TARGET MEMBER FOR USE IN A POSITIONING SYSTEM

[75] Inventor: Harry B. Hammill, III, Williamsville, N.Y.

[73] Assignee: Calspan Corporation, Buffalo, N.Y.

[21] Appl. No.: 788,989

[22] Filed: Oct. 18, 1985

[51] Int. Cl.$^4$ .................. G01B 11/26; G01C 1/00
[52] U.S. Cl. ................................. 356/152; 356/141
[58] Field of Search ................ 356/141, 152, 1, 4, 356/5

[56] References Cited

U.S. PATENT DOCUMENTS

| Re. 29,025 | 11/1976 | Hansen | 356/138 |
|---|---|---|---|
| 3,119,501 | 1/1964 | Lemelson | 214/16.4 |
| 3,816,000 | 6/1974 | Fiedler | 356/152 |
| 3,824,020 | 7/1974 | Pease | 356/152 |
| 3,887,282 | 6/1975 | Hansen | 356/138 |
| 4,053,233 | 10/1977 | Bien et al. | 356/141 |
| 4,122,957 | 10/1978 | Allen et al. | 214/16.4 A |
| 4,219,847 | 8/1980 | Pinkney et al. | 358/126 |
| 4,331,417 | 5/1982 | Shearer, Jr. | 414/273 |
| 4,413,907 | 11/1983 | Lane | 356/141 |
| 4,470,664 | 9/1984 | Shirasawa | 356/4 |

OTHER PUBLICATIONS

An article entitled "Robot Guidance Using Computer Vision" by J. W. Courtney and J. K. Aggarwai, Laboratory for Image and Signal Analysis and Department of Electrical Engineering, The University of Texas at Austin, Austin, Texas 78712, 1983 IEEE.

Primary Examiner—Stephen C. Buczinski
Assistant Examiner—Melissa L. Koltak
Attorney, Agent, or Firm—Biebel, French & Nauman

[57] ABSTRACT

A target member mounted on a stationary object, such as a pallet, includes at least three reflector elements. An identifying means, such as a high intensity light source, and an imaging sensor are carried by another, movable object, such as a forklift truck. The reflector elements are so configured as to form images of the identifying means with said images defining a plane oriented other than normal to align from the identifying means to that plane, the images also defining a circle that does not include the identifying means. The target member may be in the form of a vertically oriented planar support member on which are mounted a pair of convex mirrors and a concave mirror. The images of the identifying means in the mirrors are detected by an imaging sensor, such as a television camera, and the directions of each of the images at the camera are used to determine all six degrees of positional information of the sensor with respect to the target. That information may be used to guide the forklift truck into position relative to a pallet. The target support member may also include retroreflector elements to aid in locating a pallet, and a bar code to distinguish one pallet from another.

19 Claims, 20 Drawing Figures

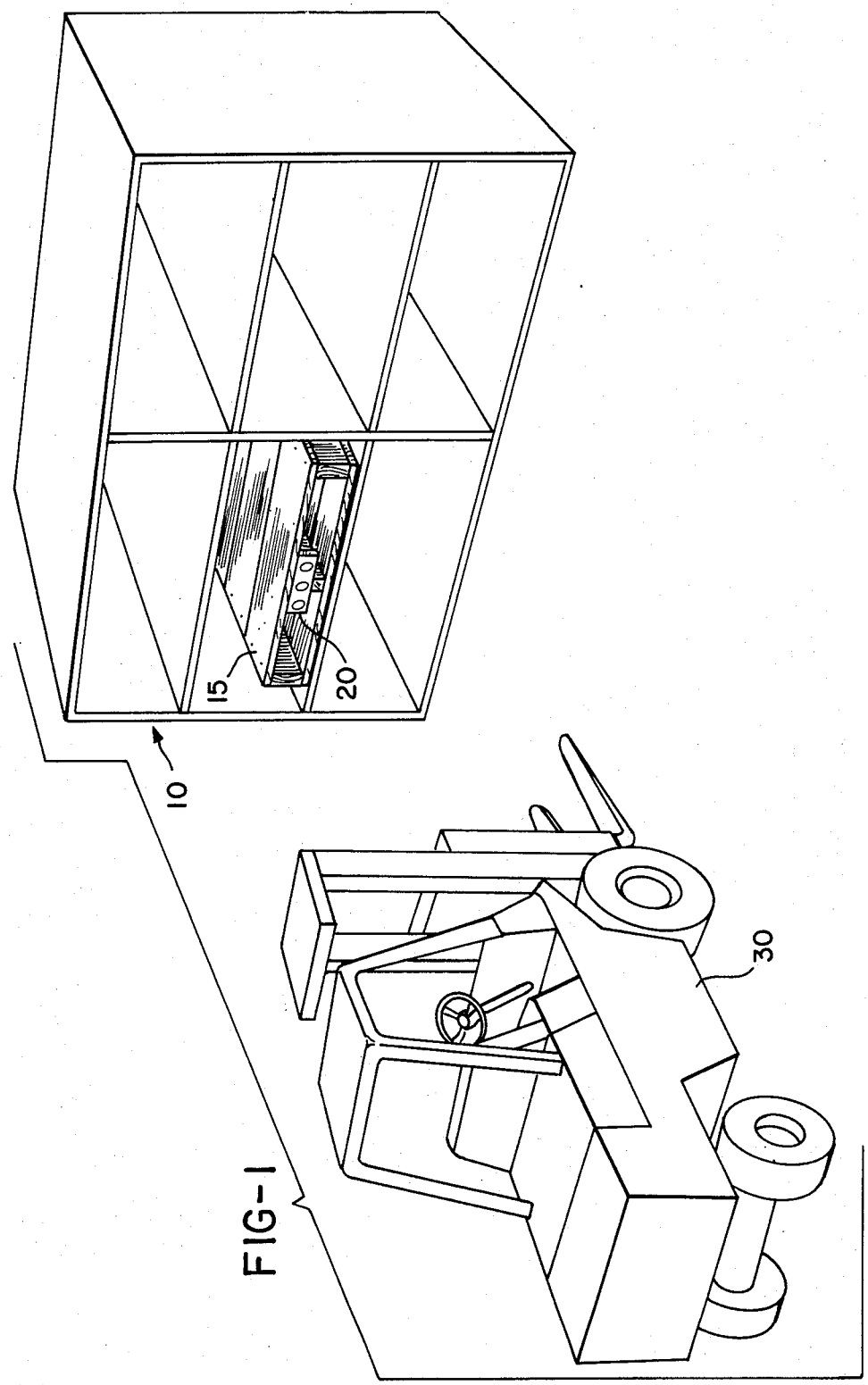

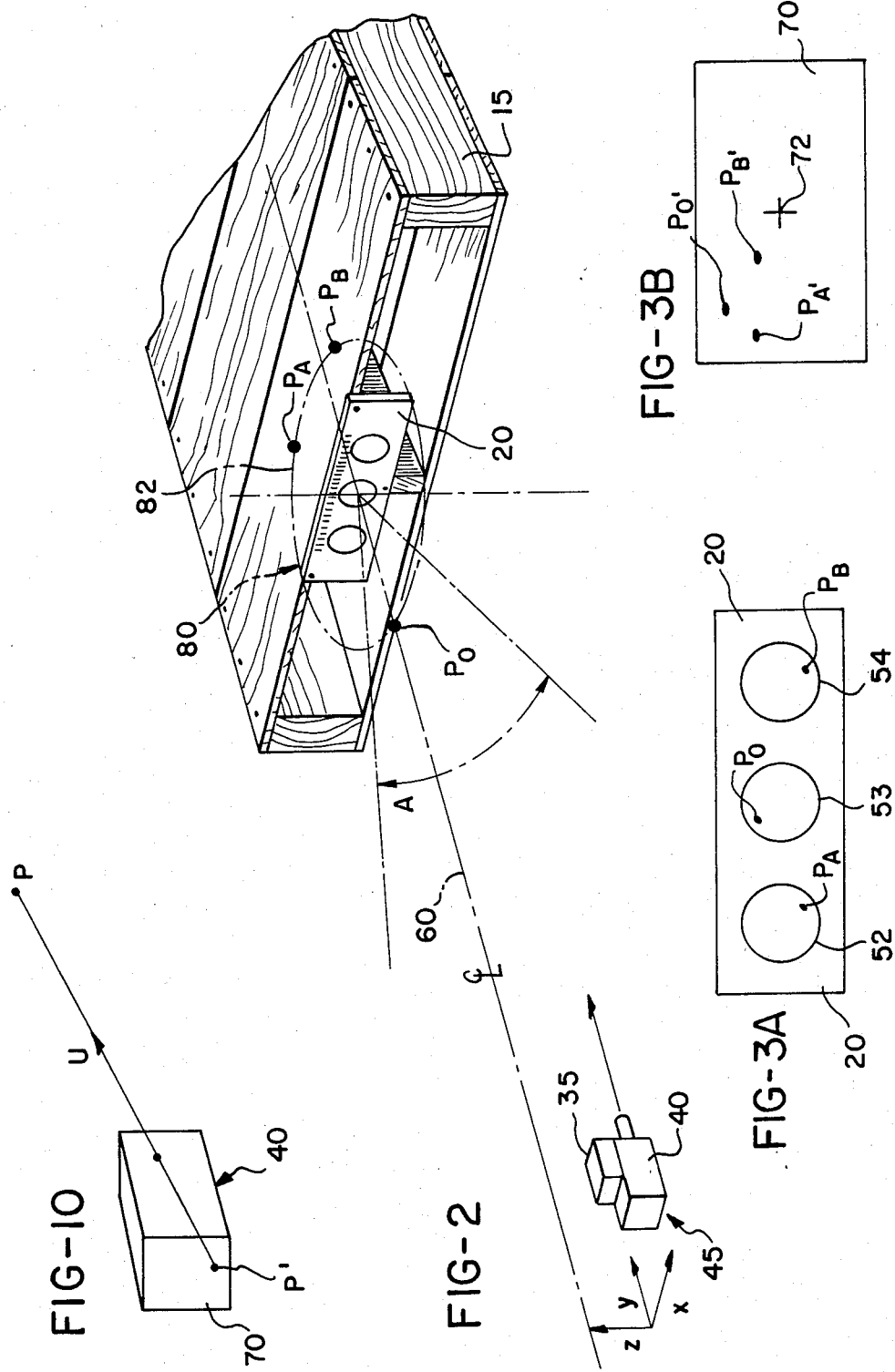

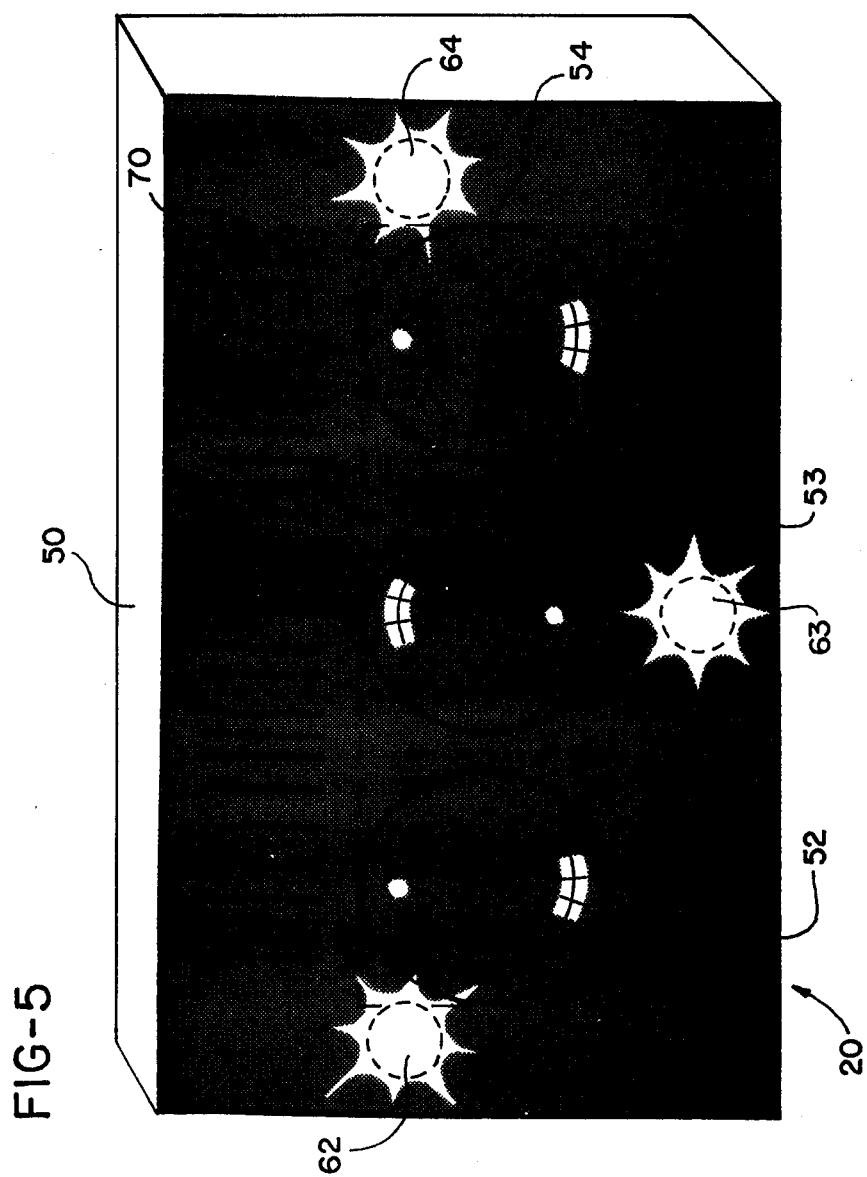
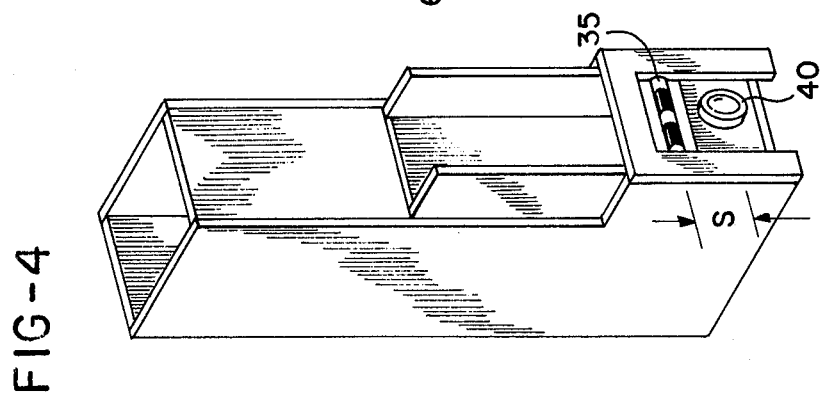

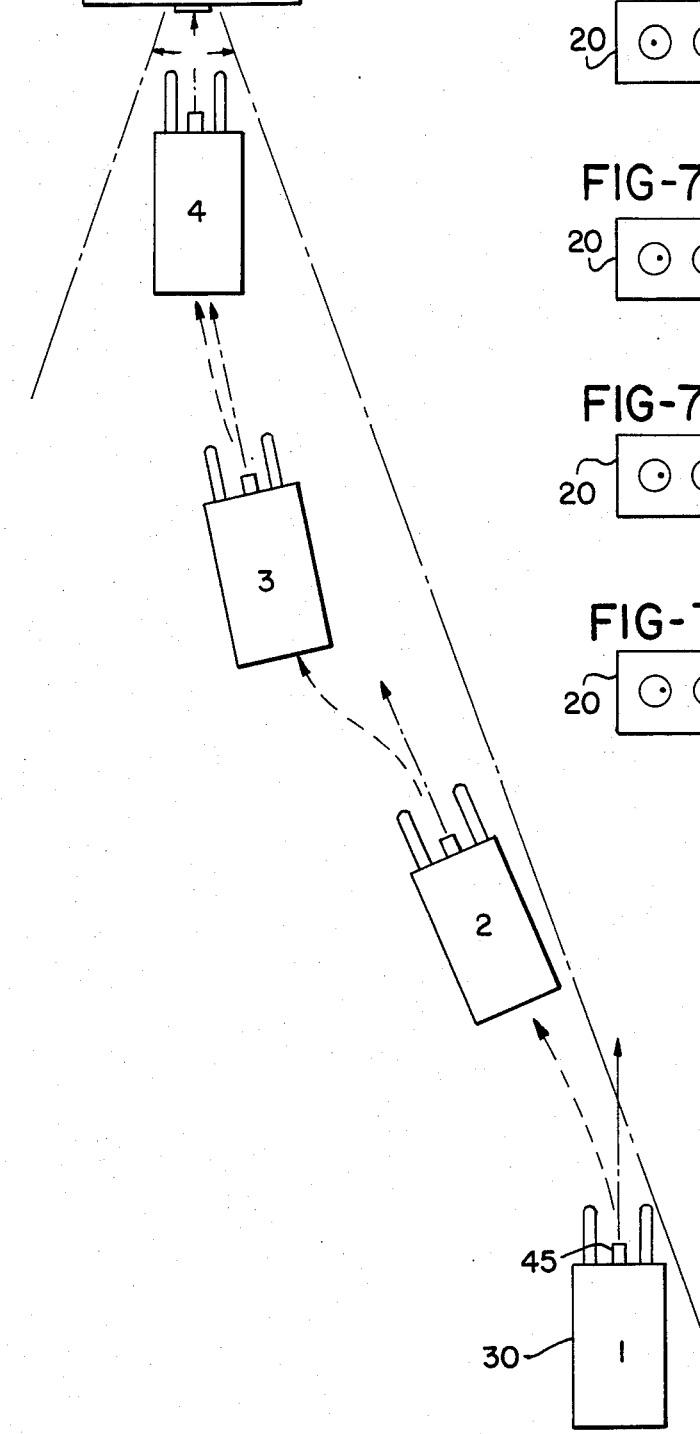

TARGET MEMBER FOR USE IN A POSITIONING SYSTEM

BACKGROUND OF THE INVENTION

This invention relates to method and apparatus for determining the position and orientation of a target with respect to a sensor. Both the target and the sensing unit may be affixed to movable objects, although generally the target will be stationary, and the sensing unit will be attached to a self-propelled vehicle. In a preferred embodiment of this invention, a target member is attached to a pallet, and the position and orientation information is used in the maneuvering of an automatically guided forklift truck to the pallet.

There are many prior art devices which attempt to determine the location of a vehicle with respect to a target. In these devices, the vehicle carries a sensing unit, the output of which controls some function of the vehicle, such as its forward motion, steering control or the vertical location of the forks. The target might be the pallet itself or the frame or rack on which the pallet is supported. Some of the prior art devices employ specialized marks whose dimensions are known; others utilize special light projectors and sense the light reflected from the target for positioning a vehicle, or a component of the vehicle, such as the forks of a lift truck.

When using a plurality of marks located on the target, it is difficult, and becomes close to impossible, to determine accurately all six degrees of freedom, that is, horizontal position—right and left, horizontal position—forward and back, vertical position, roll, pitch and yaw. These prior art systems do not give adequate positional information, especially when the vehicle is positioned directly in front of the target, to guide the vehicle accurately.

SUMMARY OF THE INVENTION

This invention is directed to a target member for use in a positioning system for providing at least three identifiable images positioned with respect to a sensor carried by a self-propelled vehicle. These three images are located so as to provide an unambiguous frame of reference thereby to allow the determination of all six positional and orientational degrees of freedom from a single observation of the target by the sensor.

By translating or rotating the plane of the images from what has traditionally been normal viewing by the sensor to a plane which is essentially parallel to a line from the sensor to the target, positional ambiguities are resolved and accurate information regarding the relative location of the vehicle to the target is obtainable, even when the vehicle is located directly in front of the target.

In one embodiment of the invention, the target includes at least three reflector elements mounted on a support member. The target and the reflector elements provide a thin, essentially flat surface while at the same time providing to the vehicle mounted sensor the appearance of a target having considerable depth. The mirrors are selected so that the images of a light source carried by the vehicle define a plane and a circle. The plane is not normal to the sensor viewing axis, and the circle does not include the sensor. A light source was chosen as the identifying means so that it could be readily detected by commercially available sensing devices, such as a small television camera.

Preferably, the reflector elements have at least two different radii of curvature. For example, two of the reflectors may be convex and have the same radius of curvature, and the third reflector may be concave. The radius of curvature and diameter of each are selected so that the reflection of the light source may be viewed by a sensor when the vehicle is within a predetermined field of view with respect to the target. It is necessary, of course, to allow the vehicle to approach the target from some distance, and to identify the location of the target from some acceptable viewing angle.

The target member may also include retroreflector members which provide a brilliant and rather large reflection whenever the light source is flashed. The position of the reflections from the retroreflector members are used to determine the area on the sensor's image plane where the desired reflections of the light source from the curved reflector elements are to be found.

The target member may also include coded means for identifying the specific target, such as a bar code that may be scanned to confirm that the target within the field of view of the sensor is the one to be engaged by the vehicle.

Since the geometry of the reflector elements is known, the positions of the reflections on the image plane of the camera will provide the information necessary to determine accurately the relative location of the camera, and vehicle on which it is carried. Armed with this information, a guidance system may be programmed to maneuver the vehicle into proper position with respect to the target.

In the preferred embodiment, the identifying means is a light source, and specifically a xenon strobe lamp for providing a short duration, high intensity pulse of light directed away from the front of the vehicle along the axis of the camera and back to the sensor via the mirrors. Ideally, the camera and the light source would be collocated. It is possible to use half silvered mirrors so that the center of the light source falls upon the axis of the lens of the camera. However, a practical embodiment of the invention places the light source immediately above the camera. It has been found that this slight offsetting does not appreciably affect the accuracy of the measurements taken.

It is, therefore, an object of this invention to provide a target member for use in a positioning system that employs at least three reflector elements with each of the reflector elements being so configured to form images of an identifying means in a plane that is oriented other than normal to a line from the identifying means to the plane.

It is another object of this invention to provide a method and apparatus for determining the relative position of a vehicle with respect to a target member which includes three reflectors, two convex, and one concave, mounted horizontally on the target member.

These and other objects and advantages of the invention will be apparent from the following description, the accompanying drawings and the appended claims.

BRIEF DESCRIPTION OF THE DRAWINGS

FIG. 1 is a perspective view showing a rack capable of supporting a plurality of pallets, and an automatically guided vehicle carrying a light source and a camera for sensing the reflections of the light source in a reflector member attached to a selected pallet.

FIG. 2 is a perspective view showing the camera and light source located below and to the right of a line passing perpendicular to and through the center of the target or reflector member.

FIG. 3A is a view showing the reflections of the light source in the reflector elements. FIG. 3B is a view showing the reflections from the mirrors on the target as they appear on the image plane of the camera.

FIG. 4 is a perspective view showing the camera and light source mounted on the forklift vehicle.

FIG. 5 illustrates a target or reflector member with attached retroreflector members, spherical reflector elements, and a bar code.

FIG. 6 is a plan view showing various locations of an automatically guided vehicle, such as a fork lift, with respect to a pallet.

FIGS. 7A-7D represent the reflections of the light source in the reflector elements at the various locations of the vehicle with respect to the pallet, as shown in FIG. 6.

FIGS. 8A-8D represents the images of the reflections shown in FIGS, 7A-7D as they appear on the image plane of the vehicle carried camera.

FIG. 9A shows the signals due to the images of the retroreflectors as a result of the first flash of the light source. FIG. 9B shows the signals resulting from ambient light. FIG. 9C shows the signals when the light source is flashed a second time. FIG. 9D represents the electrical signals that remain after processing.

FIG. 10 is a vector diagram illustrating the directional relationship between a first image point P and the final image point P'. The illustrated vector is located at the nodal point of the sensor lens.

DESCRIPTION OF THE PREFERRED EMBODIMENT

Figure 9A:
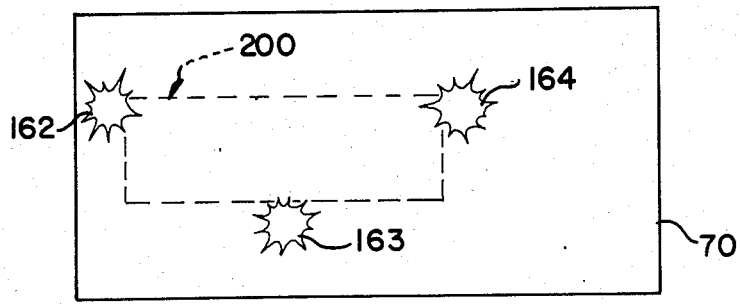
FIGS. 9A-9D represent the optical signals on the image plane of the sensor at a single location of the vehicle.

Referring now to the drawings which illustate a preferred embodiment of this invention, and particularly to FIG. 1, a pallet storage rack 10 is shown supporting a pallet 15. The pallet is provided with a target member 20.

A wooden pallet 15 is shown, and the target member 20 is illustrated as being a separate component attached to the pallet. It should be understood, however, that any type of pallet structure may be used, and the target member 20 may either be a separate unit or it may be formed integral with the pallet itself.

A vehicle 30, such as a forklift truck, carries the identification means 35 (FIGS. 2 and 4), such as a high intensity light source, and an imaging sensing means 40, which is preferably a miniature TV camera, such as a Sony XC-37 CCD camera. The light source and camera are preferably mounted together as a unit 45, with the light source 35 immediately adjacent and above the camera lens (FIG. 4). In the preferred embodiment, the vertical distance separating the light source and camera lens is approximately one inch.

The target member 20 is shown in more detail in FIG. 5, and it includes a generally flat support member 50, three reflector elements 52, 53, and 54, and three retroreflector members 62, 63, and 64. A bar code 70 for uniquely identifying the pallet may also be printed on or attached to the support member.

The light source and camera unit 45 is preferably aligned with the direction of travel of the vehicle. It is possible, however, rotatably to mount the camera on the vehicle so that it may scan through a large field of view, both horizontally and vertically. If this were done, however, the camera would be associated with a drive unit and position indicating device so that the proper corrections would be considered when calculating the relative location of the target.

The preferred embodiment of the invention, as illustrated, employs two convex reflector elements 52 and 54, and one concave reflector element 53. Each of the reflector elements is spherical in shape, and all are horizontally arranged on the support member 50. Both reflectors elements 52 and 54 have the same radius of curvature, and the radii of curvatures of all of the elements and their diameters are selected to provide a reasonable field of view A (FIG. 6) such that a reflection of the identifying means 35 will be viewable by the camera as long as the vehicle is within the field of view. In the embodiment described, it is preferred to have a minimum field of view of ±10° from the mirror platen normal. Typical mirrors may be approximately 1.5 inches in diameter and have a radius of curvature of 3 inches or greater. Mirrors 52 and 54 may be type 380 convex mirrors, and mirror 53 may be type 100 concave mirror, both manufactured by ROLYN.

It should be emphasized that the identifying means 35, while preferably a brilliant light source, could also be any means that could be detected by sensing means 40. A brilliant xenon flash lamp has been found effective for this purpose.

Referring to FIG. 2, the light/camera unit 45 is shown positioned below and to the right of the center line 60 passing through the target 20, but within the field of view A. Under these conditions, the reflection of the identifying means or light source 35 appear as images $P_A$, $P_O$, $P_B$ in mirrors 52, 53 and 54, respectively, as shown in FIG. 3. Since the mirrors are curved surfaces in the embodiment shown, the images $P_A$ and $P_B$ will appear toward the lower right portion of mirrors 52 and 54 and, the image $P_O$ will be toward the upper left in mirror 53.

Since the unit 45 is also facing essentially parallel to the center line 60, the images $P_A'$, $P_O'$, $P_B'$ of the identifying means would be grouped on the image plane 70 of the camera towards its upper left hand corner, as shown in FIG. 3B. (It will be assumed for the following illustration that the images formed on the image plane are not inverted or reversed.)

The absolute location of the reflections, the spacing between the reflections, and the relative position of all the reflections will provide information sufficient to determine from a single observation the location of the vehicle with respect to the pallet and the orientation or rotation of the pallet. As the location of the vehicle changes, the observed position of the identifying means or reflections on the image plane of the camera will also change, as will be explained.

It will be noted in FIG. 2 that the images $P_A$, $P_O$ and $P_B$ of the identifying means 35 in the reflector elements 52-54 will define a plane 80, and these images will also define a circle 82. In this invention, the plane 80 is not normal or perpendicular to the center line 60 of the target 20; it is in fact essentially parallel to the upper surface of the pallet. Further, the circle 82 will not include the lens of the camera 40. These conditions are necessary if the reflections are to provide an unambiguous result when they are analyzed to determine the location of the vehicle relative to the target.

Referring now to FIGS. 9A through 9D, these figures represent the images appearing on the image plane of the camera 40 during one sequence of operations necessary to gather positional information.

The preferred method of this invention provides for flashing the light source 35 and recording the positions of the reflections from the retroreflector members 62, 63 and 64. These reflections are identified in FIG. 9A as reflections 162, 163 and 164, respectively. These reflections are easily identified because they each occupy a plurality of pixels on the image plane 70 of the camera since they are physically large components of the target 20 and since the retroreflectors return a large percentage of the light emitted by the identifying means 35 back toward the source. For this reason, the sensitivity of the camera is reduced at this stage of the operation so that only the reflections of the retroreflectors are likely to be found at the image plane. Also, because of the high intensity of the reflected light, there may be some blooming of the image. The positions of each of the retroreflector images is recorded in memory means.

A calculation is performed by reference to the positions of the retroreflector images 162–164, and an area 200 is defined in which the reflections from the reflector elements 52–54 are likely to be found. This defined area 200 may be located anywhere on the image plane of the camera and will vary in area in proportion to the separation of the vehicle from the target. In other words, the closer the vehicle is to the target, the more widely separated will be the images, and the defined area will consequently be larger.

Figure 9B:
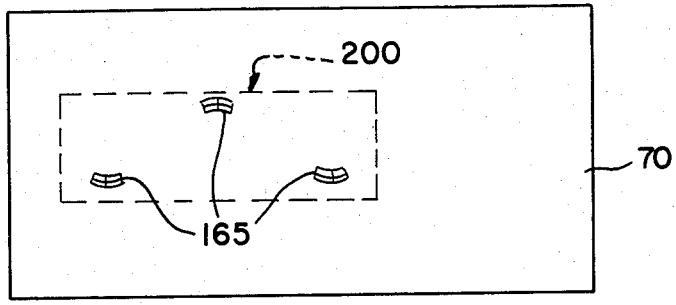

Once the area 200 has been defined on the image plane, the sensitivity of the camera is increased, and all of the images within the defined area are recorded in a recording means (FIG. 9B). These images are those resulting from ambient light and may include such reflections 165 as overhead lights, specular reflections from metal objects within the field of view, and other light sources.

Figure 9C:
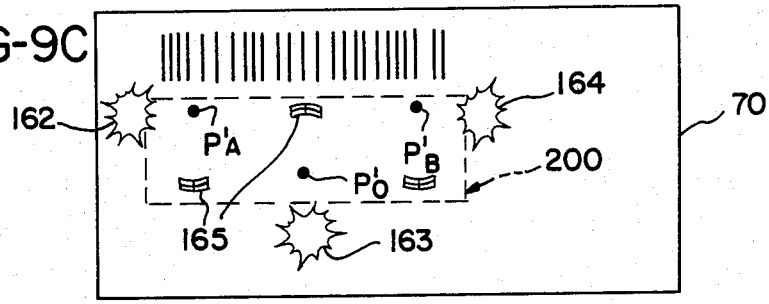

The next step is to reduce the sensitivity of the camera and again flash the light source 35. As shown in FIG. 9C, this time the image plane will contain the image of the retroreflectors 162–164, the ambient reflections 165, and also reflections $P_A$, $P_O$ and $P_B$ of the light source in each of the reflector elements 52–54. All of the images within the defined area 200 are recorded.

Figure 9D:
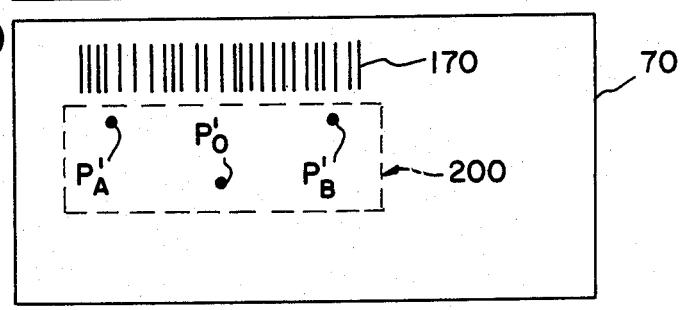

Any images from the retroreflectors that bloom into the defined area are removed from memory, and the images recorded in FIG. 9B are effectively subtracted from those in FIG. 9C, and what remains are images $P_A'$, $P_O'$ and $P_B'$, reflections of the light source in the reflector elements 52–54, as shown in FIG. 9D.

The center of each of these images $P_A'$, $P_O'$ and $P_B'$ are calculated and the video signals from the camera image plane are evaluated in accordance with the procedure later defined.

As shown in FIG. 5, the retroreflector members 62–64 surround the reflector elements 52–54. It should be apparent, however, that this physical arrangement is not absolutely necessary. The position of each retroreflector should be known so that an area in which the reflector elements are positioned can be defined.

Also, the position of the retroreflector elements further define a second area 210 in which the image 170 of the bar code 70 may be found, and at some appropriate time during the analysis of the image, the bar code may be read to confirm that the proper target is being approached.

It should also be apparent to those skilled in the art that the reflector elements 52–54 do not all have to be spherical in shape. All that is necessary is that the images of the identifying means carried by the vehicle be viewable by the camera. This means that one or more of the reflector elements could be a retroreflector. Using spherical mirrors, however, reduces the cost of the target and also provides relatively smaller images, images whose position can therefore be determined with a high degree of accuracy.

It is assumed in this description that the mirrors are evenly spaced and are horizontally aligned, and that the center line of the target, that is, the center mirror, is the desired final position of the light/camera unit 45. It should be recognized, however, that any orientation of the mirrors and any position of the camera unit with respect to the target would be acceptable and would not depart from this invention. All that the control circuit would need is information regarding the final desired position of each of the reflections on the image plane. Because of convention, and for purposes of explanation, it will be assumed that the desired final position will be on the center line with the images equally spaced on the image plane and that the images are in a horizontal line.

Referring now to FIGS. 6, 7A–7D and 8A–8D, it is assumed that the light/camera unit 45 is in the same horizontal plane as the target, and the vehicle 30 is positioned to the right of the center line 60 in location 1. The reflections of the light source are shown in FIG. 7A, and the images of the reflections on the image plane 70 of the camera 40 are shown in FIG. 8A and would be located in the left center of the image plane. The images are close together and unequally spaced. The location of the images on the image plane and their relative spacing are all important to the calculations for determining the vehicle's relative location with respect to the target.

Assuming the vehicle moves to location 2 in FIG. 6, the images of the reflections on the image plane will move apart (due to the closer proximity to the target) and they will also move toward the right side of the image plane 70, as shown in FIG. 8D (due to the change in the direction of the vehicle).

When the vehicle arrives at location 3, it will be seen in FIG. 8C that the image of the reflections on the image plane move toward the center and each reflection moves away from each other reflection. In this case, the center reflection is still closer to the left hand reflection because the vehicle is still not located on the center line of the target.

Finally, when the vehicle reaches location 4 in FIG. 6, the reflections of the light source will be centered in the mirrors, as shown in FIG. 7D, and the images on the image plane will be in the position shown in FIG. 8D.

The technique for calculating the relative positions of the vehicle and target will now be discussed.

One of the target points, the center one, $P_o$, is chosen as a target reference point or origin.

The other two points, $P_A$ and $P_B$, have 3-dimensional vector offsets from $P_o$. These offset vectors are identified as a and b in the target coordinate system.

TARGET POINTS AS VIEWED BY SENSOR. Consider an axis system fixed with respect to the camera. The specific axis system chosen is the right-handed system shown in FIG. 2, with x representing horizontal, positive to the right; y representing horizontal, positive along forward lens axis; and z representing vertical, positive up. The first nodal point of lens, i.e., the center of the lens of camera 40 for idealized "thin" lens is considered the origin.

In this system, the target reference point $P_o$ will be at some vector location, R.

If the pallet is not rotated, then points $P_A$ and $P_B$ would be at vector locations $R+a$ and $R+b$, respectively. In general, however, there will be some rotation, i.e., a and b will be rotated. There are, therefore, these forms for vectors in the two axis systems:

| Target Point Label | Vector Locations in Pallet Axes | Vector Locations in Sensor Axes |
| --- | --- | --- |
| $P_o$ | (origin) | R |
| $P_A$ | a | $R + \alpha$ |
| $P_B$ | b | $R + \beta$ | where $\alpha$ and $\beta$ are related to the original vectors by a rotation matrix M:

$$\alpha = Ma$$

$$\beta = Mb$$

In short, the image points will correspond to three points which, from the viewpoint of the sensor, are at locations R, $R+\alpha$, $R+\beta$. The vectors R, $\alpha$ and $\beta$, and the rotation matrix M, are initially unknown.

DIRECTION VECTORS, u, v, w. In general, the direction of any single source or target point can be established with a camera system, but not distance. The direction can be defined by a vector from image point to lens center (thin lens) or second nodal point (thick lens). See FIG. 9.

For the target points, let the direction vectors corresponding to $P_o$, $P_A$, and $P_B$ be called u, v, w, respectively. These vectors could be chosen as unit vectors (generally convenient for analysis). A more convenient and natural normalization is to scale these vectors so that the lens-axis or y-component equals focal length. The x and z components are then simply the horizontal ($\xi$) and vertical ($\eta$) components of location in the focal plane. (With due regard for signs and "image reversal.")

BASELINE VECTOR EQUATIONS. In terms of known direction vectors u, v, w, the basic vector equations become $$R = \lambda_o u \tag{1}$$

$$R + \alpha = \lambda_A v \tag{2}$$

$$R + \beta = \lambda_B w \tag{3}$$

where $\lambda_o$, $\lambda_A$, $\lambda_B$ are (unknown) scalars proportional to distance.

Equations (1) through (3) are underdetermined. There are 12 unknowns (three components each for R, $\alpha$, $\beta$ vectors, plus the three scalar $\lambda$'s), and nine scalar equations. The "missing" three equations come from scalar invariance relationships.

SCALAR INVARIANCE RELATIONSHIPS: THREE SCALAR EQUATIONS. Although $\alpha$ and $\beta$ are unknown as vectors, partial information comes from scalar invariants of (rigid-body) rotation. Specifically, if $$\alpha = Ma; \beta = Mb, M = \text{rotation matrix},$$

then $$\alpha \cdot \alpha = \alpha^2 = a^2 \text{ (known)} \tag{4}$$

$$\beta \cdot \beta = \beta^2 = b^2 \text{ (known)} \tag{5}$$

$$\alpha \cdot \beta = a \cdot b \text{ (known)} \tag{6}$$

These equations correspond to the physical properties that rotation does not change vector lengths, and for rigid-body rotation the angle subtended by any two vectors remains unchanged.

ALGORITHM OVERVIEW: REQUIREMENTS, PHILOSOPHY, PROBLEMS. Equations (1) through (6) collectively form a fully determined baseline equation set. They give 12 nonlinear (scalar) equations in 12 (scalar) unknowns, if evaluation of unknown rotation matrix M is temporarily regarded as a "later step."

The algorithmic steps are based upon mathematical analysis that successively reduces the dimensionality of the problem. The ultimate step becomes that of solving a single nonlinear equation in one unknown, after which the reduction steps are retraced to give explicit values of the other variables. At the end of the retrace, R, $\alpha$, and $\beta$ are known.

A separate procedure is then developed to establish, from computed $\alpha$ and $\beta$ and preset a and b vectors, the rotation matrix M. From M, the evaluation of "standard" rotation angles—pitch, roll, and yaw—is then straightforward. Evaluation of explicit pitch, roll, and yaw is convenient for sensitivity studies and design analysis. For the operational system, these angles may not be explicitly required.

Although the obvious goal of algorithmic development is to achieve some method of solving the large set of simultaneous nonlinear equations, there is not necessarily uniqueness in the approach. To the extent possible, the exact approach chosen and documented here was aimed at (a) minimizing sensitivity to effects of computer roundoff errors and (b) providing for efficient, that is fast, computation.

There are two distinct solutions to a given problem. An algorithm requirement, therefore, is the capability to evaluate both solutions and to select the one that is "correct." Problems of "correctness" are addressed later.

The sequence of steps to reduce the baseline equations, leading to evaluation of the primary vectors R, $\alpha$, and $\beta$ will now be described.

EQUATIONS (1) THROUGH (3): CHANGE IN $\lambda$ PARAMETERS. In Equations (1), (2), and (3), this change of variables for the $\lambda$'s:

$\lambda_o$: (no change)

$\lambda_A = \lambda_o(l + \epsilon)$ $\lambda_B = \lambda_o(l + \delta)$ gives revised forms $$R = \lambda_o u \tag{1'}$$

$$R + \alpha = \lambda_o(1+a)v \tag{2'}$$

$$R + \beta = \lambda_o(1+a)w. \tag{3'}$$

This form allows separation of variables as discussed below, and also eventually allows isolation of "small" from "large" quantities.

ELIMINATION OF R. Equation (1') can be substituted into Equations (2') and (3') to give two equations for $\alpha$ and $\beta$ with $\lambda_o$ as a parameter:

$$\alpha/\lambda_o = (1+\epsilon)v - u = (v-u) + \epsilon v \tag{7}$$

$$\beta/80_o = (1+\delta)w - u = (w-u) + \delta w \tag{8}$$

These equations are characterized by two forms of isolation of "large" from "small" variables. First, the R vector, which is generally large relative to the $\alpha$ and $\beta$ vectors, has been eliminated. Second, the parameter $\lambda_o$, which is generally large relative to the $\epsilon$, $\delta$ parameters, has been partially isolated. This isolation will become complete in the next two steps.

REDUCTION TO THREE SCALAR EQUATIONS. The vector Equations (7) and (8) can be converted to three scalar equations with vector dot-product forms proportional to $\alpha^2$, $\beta^2$, $\alpha \cdot \beta$:

$$\alpha^2/\lambda_o^2 = (v-u)^2 + 2\epsilon v \cdot (v-u) + \epsilon^2 \cdot v^2 \tag{9}$$

$$\beta^2/\lambda_o^2 = (w-u)^2 + 2\delta w \cdot (w-u) + \delta^2 \cdot w^2 \tag{10}$$

$$\alpha \cdot \beta/\lambda_o^2 = (v-u)\cdot(w-u) + \epsilon v \cdot (w-u) + \delta w \cdot (v-u) + \epsilon\delta v \cdot w \tag{11}$$

Note that $\alpha^2$, $\beta^2$, and $\alpha \cdot \beta$ are known (Equations 4, 5 and 6). Also, all of the vector dot products on the right-hand sides of these equations are constants that depend only upon known u, v, w vectors.

These equations, therefore, have the form $$\alpha^2/\lambda_o^2 = A_1 + A_2\epsilon + A_3\epsilon^2 \tag{9'}$$

$$\beta^2/\lambda_o^2 = B_1 + B_2\epsilon + B_3\epsilon^2 \tag{10'}$$

$$\alpha \cdot \beta/\lambda_o^2 = C_1 + C_2\epsilon + C_3\epsilon^2 + C_4\epsilon\delta, \tag{11'}$$

with $\alpha^2$, $\beta^2$, $\alpha \cdot \beta$, $A_1$, ... $C_4$ as known constants, and with three scalar unknowns $\lambda_o$, $\epsilon$ and $\delta$.

ELIMINATION OF $\lambda_o$: REDUCTION TO TWO SCALAR EQUATIONS. A consequence of the change from $(\lambda_o, \lambda_A, \lambda_B)$ to $(\lambda_o, \epsilon, \delta)$ is the way in which $\lambda_o$ is isolated in Equations (9) through (11). Elimination of $\lambda_o$ is now a trivial algebraic step, giving two equations in scalars $\epsilon$ and $\delta$ only. The obvious forms are $$\beta^2[A_1+A_2\epsilon+A_3\epsilon^2] = \alpha^2[B_1+B_2\delta+B_3\delta^2]$$

$$(\alpha \cdot \beta)\cdot[A_1+A_2\epsilon+A_3\delta^2] = \alpha^2[C_1+C_2\epsilon+C_3\delta+C_4\epsilon\delta].$$

These are simply two 2-dimensional polynomials in $\epsilon$ and $\delta$, expressible in form $$D_1+D_2\epsilon+D_3\epsilon^2+D_4\delta+D_5\epsilon^2 = 0 \tag{12}$$

$$E_1+E_2\epsilon+E_3\delta^2+E_4\delta+E_5\epsilon\delta = 0 \tag{13}$$

where D and E coefficients are combinations of (previous) known constants.

REDUCTION TO EQUATION IN ONE VARIABLE, $\epsilon$. Equations (12) and (13) are near the end of the reduction process. They could be solved simultaneously, using (for example) a 2-dimensional version of Newton successive approximation. That approach is not preferred, largely because of practical problems in determining two distinct solutions (a requirement previously referred to), and because convergence would probably be slower than for alternatives discussed below.

Equations (12) and (13) could also be combined to give a purely 1-dimensional equation in $\epsilon$—a fourth-order polynomial equation of form $$P_1+P_2\epsilon+P_3\epsilon^2+P_4\epsilon^3+P_5\epsilon^4 = 0 \tag{14}$$

This approach is analytically attractive. In its final form, the polynomial computations would be simple and easily adapted to finding multiple solutions. Convergence would generally be fast relative to a 2-variable approach.

The practical disadvantage of the Equation (14) approach is the complexity, lengthy software code and computation time involved in evaluating the P coefficients prior to solving for roots.

The preferred approach is a 1-dimensional approach of a somewhat different form.

First, note that Equation (13) can be solved for $\delta$ as an explicit function of $\epsilon$:

$$\delta = g(\epsilon) = \frac{-(E_1 + E_2\epsilon + E_3\epsilon^2)}{E_4 + E_5\epsilon} \tag{15}$$

Equation (12) can then be written as if a function only of $\epsilon$:

$$f(\epsilon) = D_1+D_2\delta+D_3\epsilon^2+D_4\delta+D_5\epsilon^2 = 0 \tag{16}$$

with the understanding that $\delta$ is always evaluated (from Equation (15)) as a function of $\epsilon$.

An $\epsilon$-solution, therefore, is a value of $\epsilon$ for which Equation (16) holds. The corresponding $\epsilon$ is then given by Equation (15), once an $\epsilon$ solution is identified.

This approach, discussed below, has the convergence rate of the "pure" 1-dimensional approach (4th-order polynomial), but with a lesser amount of subsidiary computation.

FINAL EQUATIONS FOR $\epsilon$ AND $\delta$: GENERAL PROPERTIES AND PROBLEMS. The final approach involves finding the $\epsilon$ root, or roots, for $$f(\epsilon) = D_1+D_2\epsilon+D_3\epsilon^2+D_4\epsilon+D_5\epsilon^2 = 0 \tag{16, repeated}$$

with $\delta$ as an explicit function of $\epsilon$:

$$\delta = \frac{-(E_1 + E_2\epsilon + E_3\epsilon^2)}{E_4 + E_5\epsilon}. \tag{15, repeated}$$

For the class of problems and target-point geometries that occur in applications of the type described here, there are normally two distinct real roots to Equation (16), and two complex roots. Physical solutions correspond to the two real roots.

Of the two physical solutions, one is "usually" identifiable as not valid. For some of the retroreflector target-point geometries (vs. mirror configurations), and in presence of mosaic quantization and/or other sources of errors, resolution of correct versus incorrect solution is not necessarily reliable. This problem is strictly a data error problem, not an algorithmic problem. Empirical studies indicate that this type of problem does not occur for the mirror configuration and realistic distance/angle combinations.

A potential problem exists with Equation (15), in that for some value of $\epsilon$ (say, $\epsilon_o$) a zero denominator occurs. Theoretically (i.e., in absence of roundoff errors), this case must imply that the numerator is also zero and that a definite (finite) limiting value exists.

In software implementation, this zero/zero problem is explicity treated only for the following special case analytically established as physically possible:

$\epsilon_o = 0$ $E_1 = E_4 = 0$

For this case, Equation (15) is replaced with $$\delta = \delta(\epsilon) = \frac{E_2 + E_3\epsilon}{E_5} \quad \text{(15, special form)}$$

No instances of zero-denominator problems have occurred in several thousands of software execution of the algorithms. That fact does not, of course, guarantee that such a problem will never occur. Of course, additional protective code could be added. Without such code, however: (a) the likelihood of a problem is small, and (b) at worst, an abort of a pallet load or unload operation would occur.

THE "SECOND ROOT" PROBLEM. Consider a situation in which (a) a real root, $\epsilon_1$, has been evaluated for Equation (16), and (b) this root is judged to be the wrong root. For this case, the second root is established as the root of:

$$g(\epsilon) = 0 \quad (17)$$

$$g(\epsilon) = \frac{f(\epsilon)}{\epsilon - \epsilon_1} \text{ if } \epsilon \neq \epsilon_1 \quad (17a)$$

$$= f'(\epsilon_1) \text{ if } \epsilon = \epsilon_1 \quad (17b)$$

Equation (17b) is the limiting form of (17a) as $\epsilon$ approaches $\epsilon_1$.

This formulation is equivalent to dividing out an $(\epsilon-\epsilon_1)$ factor from a pure polynomial form.

The pair of equations (15 and 16) yield double roots for $\epsilon$ and $\delta$. Procedures for establishing both $\epsilon$ and $\delta$ pairs and selecting the physically valid values are required.

THE RETRACE STEP. A series of steps of variable elimination, leading eventually to the evaluation of the $\epsilon$ and $\delta$ parameters, has been described. Retracing is the process of then working backwards, with known $\epsilon$ and $\delta$, to get the three required baseline vectors: R, $\alpha$ and $\beta$.

RETRACE TO $\gamma_o$. The $\gamma_o$ parameter is a required intermediate variable. It is obtained from Equation (9'), rewritten in the explicit form $$\lambda_o = \sqrt{\frac{A_1 + A_2\epsilon + A_3\epsilon^2}{\alpha^2}} \quad (18)$$

It could also be evaluated from Equation (10'), or (provided $\alpha \cdot \beta \neq 0$) from Equation (11'), since $\epsilon$ and $\delta$ have, in principle, been evaluated to make these three equations compatible.

RETRACE FOR R, $\alpha$, AND $\beta$. With $\epsilon$, $\delta$, and $\lambda_o$ established, then:

$$R = \lambda_o u \quad (19)$$

$$\alpha = \lambda_o [v \cdot u + \epsilon v] \quad (20)$$

$$\beta = \lambda_o [w \cdot u + \delta w] \quad (21)$$

The steps for determining rotation matrix and the pitch, roll, yaw angles will now be described.

THE ROTATION PROBLEM: THE M MATRIX. Once $\alpha$ and $\beta$ are evaluated, a new algorithmic problem arises in solving for the unknown rotation matrix M that satisfies $$\alpha = Ma \quad (22)$$

$$\beta = Mb. \quad (23)$$

M is a $3 \times 3$ matrix, hence with nine elements. These nine elements are not independent, however. The constraint that M be a rotation matrix implies that only three degrees of freedom exist. These three degrees of freedom can be identified with pitch, roll, and yaw angles, but that identification is neither required nor useful in the steps to solve for M.

MATRIX FORMULATION NO. 1 TO GIVE M. The two Equations (22) and (23) can be supplemented with a third linearly independent equation, that must be true for a rigid body rotation:

$$\alpha \otimes \beta = M(a \otimes b) \quad (24)$$

where $\otimes$ means vector cross product.

Now write the separate Equations (22) through (24) as a single matrix equation $$\begin{pmatrix} | & | & | \\ \alpha & \beta & \alpha \otimes \beta \\ | & | & | \end{pmatrix} = M \begin{pmatrix} | & | & | \\ a & b & a \otimes b \\ | & | & | \end{pmatrix} \quad (25)$$

$$Q = MP \quad (25')$$

where, for example, P has vector a as its first column, vector b as second column, etc.

The matrix P is nonsingular (provided only that the pallet vectors a and b are not collinear), so an immediate formal solution results:

$$M = QP^{-1}$$

In this form, solution would require computation of the inverse of $3 \times 3$ P matrix, followed by a matrix-times-matrix product.

MATRIX FORMULATION NO. 2 TO GIVE M. The actually implemented algorithm for calculation of the M matrix avoids the computational effort of matrix inversion. The concept is to use not the $\alpha$ and $\beta$ vectors (and $\alpha \otimes \beta$) directly, but to use equally valid combinations that are orthonormal. For a matrix with orthonormal columns, inversion is not explicitly required—the inverse is simply the transpose.

Three base vectors $\hat{\alpha}$, $\hat{\beta}$, and $\hat{\gamma}$ will be chosen by combining and normalizing the $\alpha$ and $\beta$ vectors. Exactly the same (hence compatible) combinations and normalization will be applied for the a, b vectors, giving $\hat{a}$, $\hat{b}$, $\hat{c}$. Vectors $\hat{\alpha}$, $\hat{\beta}$, and $\hat{\gamma}$ will form an orthonormal set (orthogonal unit vectors); $\hat{a}$, $\hat{b}$, $\hat{c}$ will also form an orthonormal set; and the same M-matrix rotation property will hold. A form analogous to Equation (25) is then $$\begin{pmatrix} | & | & | \\ \hat{\alpha} & \hat{\beta} & \hat{\gamma} \\ | & | & | \end{pmatrix} = M \begin{pmatrix} | & | & | \\ \hat{a} & \hat{b} & \hat{c} \\ | & | & | \end{pmatrix} \quad (27)$$

$$\hat{Q} = M\hat{P} \quad (27')$$

but with the distinctio the inverse of $\hat{P}$ is simply the transpose of $\hat{P}(\equiv \hat{P}')$. Therefore $$M = \hat{Q}\hat{P}' \quad (28)$$

Algorithmic steps to get the orthonormal vectors are discussed below. ESTABLISHING $\hat{\alpha}, \hat{a}$. The first vectors, $\hat{\alpha}$ and $\hat{a}$, are trivial:

$$\hat{\alpha} = \text{unit } (\alpha)$$

$$\hat{a} = \text{unit } (a) \quad (29)$$

where unit "( )" means normalized to unit length.

ESTABLISHING $\hat{\beta}, \hat{b}$. For $\hat{\beta}$, we want a vector orthogonal to $\hat{\alpha}$ (hence, orthogonal to $\alpha$), that retains the information in $\beta$. The simplest construct, and the one implemented, is to first form the linear combination $$\beta' = \beta - c\,\alpha \quad (30)$$

with the constant c chosen as $$c = \frac{\alpha \cdot \beta}{\alpha^2}. \quad (31)$$

Then $\beta'$ will be orthogonal to $\hat{\alpha}$ and $\alpha$. The second step is then simply to normalize $\beta'$ to a unit vector:

$$\hat{\beta} = \text{unit } (\beta') \quad (32)$$

For b, the same steps are followed using a and b:

$$b' = b - ca \quad (33)$$

$$\hat{b} = \text{unit } (b'). \quad (34)$$

Note that $(a \cdot b)/a^2$ is the same as $(\alpha \cdot \beta)/\alpha^2$ from scalar invariance properties, so the "c" in Equation (30) is the same as in Equation (33).

ESTABLISHING $\hat{\gamma}, \hat{c}$. For $\hat{\gamma}$, a unit vector orthogonal to $\hat{\alpha}$ and $\hat{\beta}$ is given by the vector cross product $$\hat{\gamma} = \hat{\alpha} \otimes \hat{\beta} \quad (35)$$

Similarly, $$\hat{c} = \hat{a} \otimes \hat{b}. \quad (36)$$

Since these are (automatically) unit vectors, explicit numerical normalization steps are not required.

Equation (28) is the form used for software evaluation of M. It requires a matrix-times-matrix multiplication, no explicit matrix inversion.

PITCH, ROLL AND YAW ANGLES FROM M. The matrix M can be considered to be the product of three cononic matrices associated with put pitch, roll, and yaw. The convention chosen for the order of multiplication is $$M \cdot (\text{vector}) = P\,R\,Y \cdot (\text{vector}), \quad (37)$$

i.e., the yaw matrix Y is first applied to the vector, then the roll matrix R, then the pitch matrix P. The canonic matrices are $$Y = \begin{pmatrix} c_y & -s_y & 0 \\ s_y & c_y & 0 \\ 0 & 0 & 1 \end{pmatrix} \quad (38)$$

$$R = \begin{pmatrix} c_r & 0 & -s_r \\ 0 & 1 & 0 \\ s_r & 0 & c_r \end{pmatrix} \quad (39)$$

$$P = \begin{pmatrix} 1 & 0 & 0 \\ 0 & c_p & -s_p \\ 0 & s_p & c_p \end{pmatrix} \quad (40)$$

where $c_y = \cos$ (yaw angle), $s_y = \sin$ (yaw angle), $c_r = \cos$ (roll angle), etc., are used as abbreviations for trigonometric functions of angles. The product is then $$M = P\,R\,Y = \begin{pmatrix} c_r c_y & -c_r s_y & -s_r \\ c_p s_y - s_p s_r c_y & c_p c_y + s_p s_r s_y & -s_p c_r \\ s_p s_y + c_p s_r c_y & s_p c_y - c_p s_r s_y & c_p c_r \end{pmatrix} \quad (41)$$

Given the values of the elements ($M_{ij}$) of the M matrix, pitch, roll, and yaw angles are then evaluatable as inverse trigonometric functions:

$$\text{pitch angle} = \tan^{-1}\left(\frac{-M_{23}}{M_{33}}\right) \quad (42)$$

$$\text{roll angle} = \sin^{-1}(-M_{13}) \quad (43)$$

$$\text{yaw angle} = \tan^{-1}\left(\frac{-M_{12}}{M_{11}}\right) \quad (44)$$

While the method herein described and the form of apparatus for carrying this method into effect constitute preferred embodiments of this invention, it is to be understood that the invention is not limited to this precise method and form of apparatus, and that changes may be made in either without departing from the scope of the invention, which is defined in the appended claims.

What is claimed is:

1. A target member for use in a positioning system comprising:
    a support member; and
    at least three reflector elements mounted on said support member, each of said reflector elements being so configured as to form an image of an identifying means located within a predetermined field of view with respect to said support member, said images defining a plane oriented other than normal to a line from the identifying means to said plane, said images also defining a circle that does not include the identifying means.

2. The target member of claim 1 wherein said reflector elements include at least two different radii of curvature, the radius of curvature of each element being selected to provide a reflection of an identifying means located within a predetermined field of view with respect to said reflector member.

3. The target member of claim 1 wherein said reflector elements comprise at least three non-planar reflector elements attached to said support member in a predetermined alignment, two of said reflector elements having essentially the same radius of curvature, and the third reflector element having a different radius of curvature.

4. The target member of claim 1 wherein said reflector elements include at least one retroreflector member and at least one non-planar reflector element.

5. The target member of claim 1 wherein each of said reflector elements have essentially the same radius of curvature and wherein at least one of said reflector elements is longitutionally spaced from the others.

6. For use in a docking system in which a moving vehicle is to be aligned with and closed to a dock position, a target member to be mounted at the dock position, said target member including a flat base and at least three non-planar reflecting surfaces supported on said base in predetermined alignment, at least two of said reflecting surfaces both being either concave or convex and the third surface being opposite to the two, whereby reflections from a common radiation source are perceived at known spacing and same sense in the two surfaces and at known spacing and inverted sense with respect to the others in the third surface.

7. A target member for use in a positioning system including:

a generally flat support member;

at least three reflector elements mounted on said support member in a predetermined alignment, said reflector elements together forming images of a remotely positioned identifying means in a plane oriented other than normal to the plane of the support member;

retroreflector members mounted on said support member and surrounding said reflector elements; and coded means on said support member for uniquely identifying the target member.

8. The target member of claim 7 wherein at least two of said reflector elements are either convex or concave and have the same radius of curvature.

9. The target member of claim 7 wherein said reflector elements are mounted with the center of each on a horizontal line, and wherein two of said reflector elements are convex and the other concave.

10. The target member of claim 7 wherein said coded means is a bar code printed on said support member above said reflector elements.

11. Apparatus for use in determining the location of a vehicle within a predetermined field of view with respect to an object, said apparatus comprising:

identifying means carried by a vehicle;

a target member mounted on said object, said target member including a support member and at least three reflector elements mounted on said support member in a predetermined alignment, said reflector elements together forming images of said identifying means in a plane oriented other than normal to a line from said identifying means to said plane when said identifying means is located within a predetermined field of view with respect to said support member; and sensing means carried by said vehicle for sensing the directions of the reflections of said identifying means from each of said reflecting elements.

12. The apparatus of claim 11 wherein said reflector elements are spherical in shape.

13. The apparatus of claim 11 wherein at least two of said reflector elements are non-planar.

14. The apparatus of claim 11 wherein at least two of said reflector elements have the same radius of curvature.

15. The apparatus of claim 11 wherein said identifying means includes a high intensity light source.

16. The apparatus of claim 11 wherein said sensing means includes an imaging camera.

17. The apparatus of claim 11 wherein said target member is stationary

18. The apparatus of claim 11 wherein said target member is attached to a pallet and wherein said vehicle is a self-propelled forklift truck.

19. A method for determining the relative position of a target member from a vehicle comprising the steps of forming on the target member at least three images of an identifying means associated with the vehicle, said images defining a plane oriented other than normal to a line between the identifying means and said plane, said images also defining a circle that does not include the identifying means, and determining the directions from the vehicle of each of the images of the identifying means.

* * * * *

UNITED STATES PATENT AND TRADEMARK OFFICE
CERTIFICATE OF CORRECTION

PATENT NO. : 4,684,247

DATED : August 4, 1987

INVENTOR(S) : Harry B. Hammill, III

It is certified that error appears in the above-identified patent and that said Letters Patent is hereby corrected as shown below:

Col. 9, line 6, "$\beta/80_o$" should read --$\beta/\lambda_o$--;

line 48, "$(\alpha \cdot \beta) \cdot [A_1+A_2\epsilon+A_3\delta^2] = \alpha^2 [C_1+C_2\epsilon+C_3\delta+C_4\epsilon\delta]$" should read --$(\alpha \cdot \beta) \cdot [A_1+A_2\epsilon+A_3\epsilon^2] = \alpha^2 [C_1+C_2\epsilon+C_3\delta+C_4\epsilon\delta]$--; and line 53, "$D_4\delta+D_5\epsilon^2$" should read --$D_4\delta+D_5\delta^2$--.

Col. 10, line 28, "$D_4\delta+D_5\epsilon^2$" should read --$D_4\delta+D_5\delta^2$--; and line 43, "$D_4\epsilon+D_5\epsilon^2$" should read --$D_4\delta+D_5\delta^2$--.

Col. 13, line 10, "distinctio" should read --distinction--; and line 63, "put pitch" should read --pure pitch--.

Signed and Sealed this

Nineteenth Day of January, 1988

Attest:

DONALD J. QUIGG

Attesting Officer

Commissioner of Patents and Trademarks